(12) United States Patent
Nucci et al.

(10) Patent No.: US 7,644,150 B1
(45) Date of Patent: Jan. 5, 2010

(54) SYSTEM AND METHOD FOR NETWORK TRAFFIC MANAGEMENT

(75) Inventors: Antonio Nucci, San Jose, CA (US); Ram Keralapura, Milpitas, CA (US)

(73) Assignee: Narus, Inc., Sunnyvale, CA (US)

( * ) Notice: Subject to any disclaimer, the term of this patent is extended or adjusted under 35 U.S.C. 154(b) by 309 days.

(21) Appl. No.: 11/843,448

(22) Filed: Aug. 22, 2007

(51) Int. Cl.
*G06F 15/173* (2006.01)
(52) U.S. Cl. ............... 709/223; 709/204; 709/206; 709/207; 706/12; 706/15
(58) Field of Classification Search ............ 709/204, 709/206, 207, 223; 706/12, 15
See application file for complete search history.

(56) References Cited

U.S. PATENT DOCUMENTS

| | | | | |
|---|---|---|---|---|
| 6,412,000 B1 * | 6/2002 | Riddle et al. | .......... | 709/224 |
| 6,457,051 B1 * | 9/2002 | Riddle et al. | .......... | 709/224 |
| 6,480,885 B1 * | 11/2002 | Olivier | .......... | 709/207 |
| 7,188,173 B2 * | 3/2007 | Anderson et al. | .......... | 709/225 |
| 7,284,033 B2 * | 10/2007 | Jhanji | .......... | 709/206 |
| 2002/0120720 A1 * | 8/2002 | Moir | .......... | 709/220 |
| 2005/0147057 A1 * | 7/2005 | LaDue | .......... | 370/310 |
| 2007/0150574 A1 * | 6/2007 | Mallal et al. | .......... | 709/223 |
| 2008/0077705 A1 * | 3/2008 | Li et al. | .......... | 709/236 |
| 2009/0141634 A1 * | 6/2009 | Rothstein et al. | .......... | 370/236 |

\* cited by examiner

*Primary Examiner*—Michael Won
(74) *Attorney, Agent, or Firm*—Fernandez & Associates, LLP

(57) ABSTRACT

The present invention relates to a method of managing a network. The method steps includes extracting a signature from a first traffic flow of a plurality of traffic flows on the network based on layer-3/layer-4 information of the first traffic flow, storing the signature and an identification of a layer-7 application associated with the signature in a signature repository, identifying a second traffic flow of the plurality of traffic flows being associated with the layer-7 application by correlating the second traffic flow to the signature, and managing the network based on layer-7 application identification of the plurality of traffic flows.

13 Claims, 5 Drawing Sheets

SYSTEM AND METHOD FOR NETWORK TRAFFIC MANAGEMENT

BACKGROUND OF THE INVENTION

1. Field of the Invention

The present invention relates to computers and computer networks. More particularly, the invention relates to managing network traffic in the Internet.

2. Background of the Related Art

Managing large networks involves several critical aspects such as traffic engineering, network planning and provisioning, security, billing and Quality of service (QoS), fault management, and reliability. The ability of a network operator to accurately classify network traffic into different applications (both known and unknown) directly determines the success of many of the above network management tasks. For example, identifying non-profitable P2P traffic could help an Internet Service Provider (ISP) in providing better quality of service to other revenue-generating delay/loss sensitive applications. Hence it is imperative to develop traffic classification techniques that are fast, accurate, robust, and scalable in order to meet current and future needs of ISPs.

The popularity of the new generation of smart applications (e.g., peer-to-peer (hereinafter as "P2P") applications) has resulted in several new challenges for accurately classifying network traffic in the Internet. Traditionally, ISPs have used port numbers to effectively identify and classify network traffic. For example, HTTP traffic is usually carried over TCP port 80, SSH on TCP port 22, SMTP on TCP port 25, DNS on UDP port 53, and so on. Hence ISPs could detect, block, and/or shape any unwanted or unimportant traffic in their network. This approach is extremely easy to implement and introduces very little overhead on the traffic classifier. However, in order to circumvent detection (and subsequent blocking or shaping), recently developed applications (e.g., P2P file sharing networks) have started using non-standard ports for communication. For example, P2P networks can choose random ports to communicate with each other. Furthermore, they can also use other standard ports, like TCP port 80 traditionally used by HTTP, and tunnel their traffic from the source to the destination. These strategies at the application level have essentially made port number based traffic classification inaccurate and hence ineffective.

To address the problems with port based traffic classification, techniques that rely on application payload were developed. The strategy here is to first develop a signature for a given application by analyzing and/or reverse engineering the application layer protocol, a laborious and time-consuming process. Using this signature, a subsequent flow (i.e., traffic flow or network traffic flow) that belong to the application can be accurately identified using a straightforward pattern matching technique. Although this technique is fast, accurate, robust, reusable in different contexts (e.g., firewalls, routers, network address translations (NATs), etc.), and has been the de facto industry standard, it faces the problem of scalability for two reasons. First, keeping up with the number of applications that come up everyday is impractical. For example, several hundred new P2P and gaming protocols have been introduced over the last 5 years. Second, reverse engineering these applications becomes increasingly hard when applications start using encryption, a common strategy adopted by applications to avoid detection. Consequently, keeping an up-to-date list of application signatures became a challenging task for engineers.

Given the shortcomings of port-based and signature-based approaches, pattern classification techniques based on layer-3/layer-4 information have been developed that are less dependent on individual applications, but focused on capturing and extracting commonalities in the behavior of families of applications (i.e., application classes, e.g., gaming, voice, video, peer-to-peer, etc.). Some approaches examine the connection patterns at layer-3/layer-4 network traffic, and classify traffic into different application classes using machine learning and/or clustering algorithms; other approaches examine various specific attributes of flows to group them into different application classes.

Despite the development and advancement of the pattern classification techniques, there remains a need to provide techniques defining processes (or methods) for classifying application classes of the network traffic. It would be desirable to address several open questions about the applicability in the real world. First, due to the dependence on statistical techniques that need multiple flows and multiple packets from each flow, the time required to detect and report the discovery of an application class, is much longer compared to traditional layer-7 signature matching techniques. Second, most of the prior art techniques are incapable of differentiating individual applications behaving in a similar fashion at the macroscopic level. For instance, many of these techniques detect P2P traffic but cannot identify individual protocols (e.g., eDonkey, BitTorrent, or Gnutella), which is an important requirement for network operators to prioritize traffic. Third, these techniques are not as accurate and reliable as signature-based techniques since they are heavily dependent on the point of observation and network conditions (e.g., traffic asymmetry). Fourth, even though pattern classification, by monitoring only layer-3/layer-4 data, appears to be less resource consuming compared to the signature matching approaches, it is in fact not true. Pattern classification requires maintaining considerably larger number of states in memory for processing, and thus severely limits their effectiveness in operating at very high speeds.

Techniques have also been developed in the self-learning paradigm for traffic classification. The main goal of this paradigm is to minimize the manual intervention in detecting both known and unknown applications in networks. It has been shown that applications can be distinguished by just looking at the size and direction of the first N packets in every TCP connection. These packets are then clustered into application groups using techniques like K-Means, Gaussian Mixture Model, and spectral clustering. Despite the development and advancement of the self-learning techniques, there remains a need to address several open questions. First, rate of detection of unknown applications is not effective (e.g., about 60%). Second, all packets of a TCP connection in both directions are required to classify traffic. Given that most ISP networks employ asymmetric routing (i.e., the path taken by a packet from the source to destination can be completely different from that taken from destination to source), gaining access to both directions of traffic may not always be feasible. Third, both the complexity of the algorithms used (e.g., statistical clustering, machine learning, etc.) and the fact that these algorithms need to be executed on every flow seen by the classifier, make these techniques infeasible for real-time traffic classification in high speed networks.

In this paper, examples are given relating to a tier-1 ISP network, which supports the TCP/IP network data model known within the art. The TCP/IP network data model represents the network data in five layers including the Application layer (carrying application data), the Transport layer (carrying e.g., UDP datagram consisting of UDP header and UDP data), the Network layer (carrying e.g., IP packet consisting of IP header and IP data), the Data link layer (carrying e.g., frame header, frame data, and frame footer), and the Physical layer. Those skilled in the art also use the OSI model to represent the network data in seven layers including the Application layer (or layer 7), the Presentation layer (or layer 6), the Session layer (or layer 5), the Transport layer (or layer 4), the Network layer (or layer 3), the Data link layer (or layer 2), and the Physical layer (or layer 1). The Application layer (or layer 7), the Presentation layer (or layer 6), and the Session layer (or layer 5) of the OSI model roughly correspond to the Application layer of the TCP/IP model. Many other variations of layered network data model may also be implemented in a high speed network. In this paper, the layer-7 refers to the Application layer and the layer-3/layer-4 refers to the Network layer and/or the Transport layer.

P2P networks are categorized by those skilled in the art into structured P2P networks (e.g., CHORD, PASTRY, TAPESTRY, etc.) and unstructured P2P networks. In an unstructured P2P network, different peers join and leave the network as and then they please. Unstructured peer-to-peer (P2P) networks are inherently distributed and providing an infrastructure to all users to exchange files, music, video, and other information without relying on any centralized servers. Many popular P2P networks have several million users at anytime. This completely distributed approach to finding and exchanging information can lead to network meltdown. Most of the successful P2P networks that exist today adopt the strategy of constructing hybrid networks, where the P2P network elects a few nodes as leaders for groups of nodes based on the nodes' computing/network resources. These leaders are usually referred to as superpeers or ultrapeers. In this paper, P2P traffic refers to the traffic originating from these dynamic and hybrid P2P networks. Examples of such P2P networks include eDonkey, Gnutella, KaZaa, BitTorrent, Skype, etc.

Superpeers are typically connected to several other superpeers and the main objective here is to ensure that these superpeers (and hence the peers connected to them) are connected to the rest of the network. This architecture of P2P networks has a two-level hierarchy. The first level contains all the superpeers connected to several other superpeers in the same level. The second level contains peers connected to one or more superpeers in the first level. Note that these peers at the second level may or may not be connected to other peers in the same level. This architecture ensures that when peers join or leave a network, the impact on the network (in terms of connectivity of other peers) is minimal. However the impact is higher when superpeers leave the network. Hence nodes that have significantly higher uptime values are chosen to be superpeers. Although the actual functionality of a superpeer varies depending on the particular P2P application, in general, a superpeer acts as a gateway to the rest of the network for the group of peers that are connected to it.

Although peer-to-peer networks are application layer networks built on top of the IP layer, traffic from these networks behave very similar to the rest of the Internet traffic and is virtually indistinguishable. Hence, most of the strategies that have been proposed in the past for classifying P2P traffic based on only layer-3/layer-4 information rely on first detecting nodes that are running P2P applications, and then identifying P2P traffic based on the these P2P nodes. A common strategy adopted by most P2P networks to get around the connectivity problem introduced by firewalls is to use both TCP and UDP protocols on any of the open ports. Furthermore, to optimize their performance, P2P nodes typically use both TCP and UDP protocols for control, signaling, and/or data flows. For example, a Skype peer initially talks to its superpeer using UDP, but later establishes TCP connections as well to acquire the address of the login server. Taking advantage of this property of P2P networks, one of the heuristics that has been proposed is to identify all source-destination node pairs that use both TCP and UDP transport protocols to communicate with each other and flag them as P2P nodes.

Another characteristic that distinguishes a P2P node from a node that does not run any P2P applications is the P2P node's ability to act as both a client and a server. For instance, a web server typically receives connections but does not initiate connections. Similarly, a web client typically opens one or more connections to a web server, but does not accept connections. However, a P2P node has the ability to both accept and open connections (to upload/download data/files) at the same time. Several techniques proposed in literature try to utilize this property of P2P nodes as a heuristic to detect them.

However, there are several problems while using these heuristics to detect P2P nodes: (i) False Positives: Several other protocols in the Internet, such as DNS, gaming, streaming, IRC, etc., also exhibit these properties. In other words, these non-P2P applications also use both TCP and UDP protocols to communicate between node pairs. (ii) False Negatives: All P2P nodes (or P2P node pairs) do not always satisfy the above heuristics. For example, not all P2P node pairs use both TCP and UDP protocols to talk to each other. Several P2P protocols use TCP port 80 (a port most likely to be open in almost every firewall) as a way to bypass firewalls and hence may not use both TCP and UDP protocols.

SUMMARY

In general, in one aspect, the present invention relates to a self learning system for managing a network. The system includes a logic server for extracting a signature from a first traffic flow of a plurality of traffic flows on the network based on layer-3/layer-4 information of the first traffic flow, a signature repository operatively coupled to the logic server for storing the signature and an identification of a layer-7 application associated with the signature, and a high speed monitor operatively coupled to the logic server and the signature repository for identifying a second traffic flow of the plurality of traffic flows being associated with the layer-7 application by correlating the second traffic flow to the signature, wherein the high speed monitor is operatively coupled to the network for monitoring the network and forwarding at least a portion of the plurality of traffic flows to the logic server.

In general, in one aspect, the present invention relates to a method of managing a network. The method steps includes extracting a signature from a first traffic flow of a plurality of traffic flows on the network based on layer-3/layer-4 information of the first traffic flow, storing the signature and an identification of a layer-7 application associated with the signature in a signature repository, identifying a second traffic flow of the plurality of traffic flows being associated with the layer-7 application by correlating the second traffic flow to the signature, and managing the network based on layer-7 application identification of the plurality of traffic flows.

In general, in one aspect, the present invention relates to a computer readable medium, embodying instructions executable by the computer to perform method steps for extracting a signature from a first traffic flow of a plurality of traffic flows on the network based on layer-3/layer-4 information of the first traffic flow, storing the signature and an identification of a layer-7 application associated with the signature in a signature repository, identifying a second traffic flow of the plurality of traffic flows being associated with the layer-7 application by correlating the second traffic flow to the signature, and managing the network based on layer-7 application identification of the plurality of traffic flows.

Other aspects and advantages of the invention will be apparent from the following description and the appended claims.

DETAILED DESCRIPTION

Figure 1:
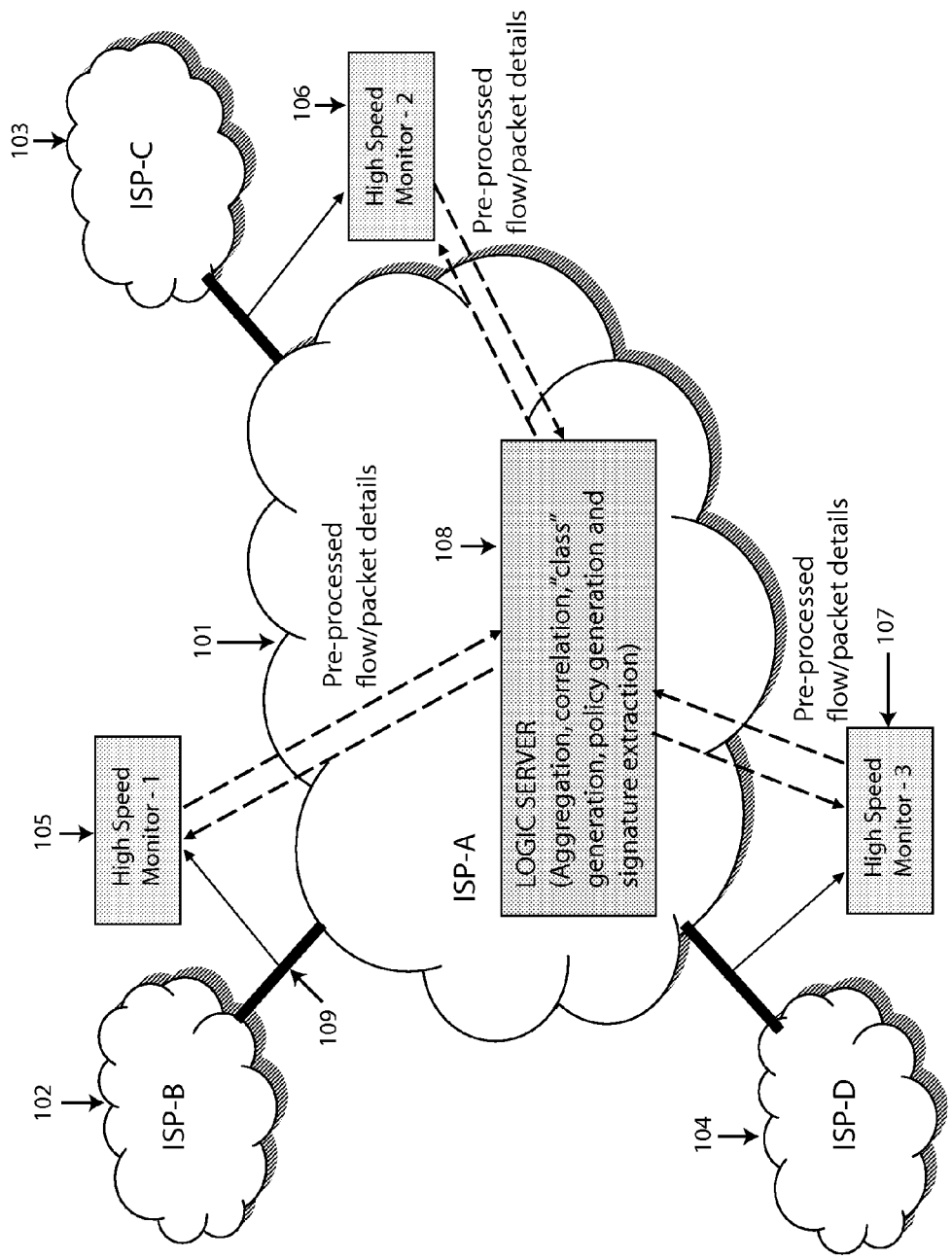
FIG. 1 shows a system architecture diagram of a Self-Learning Traffic Classifier (SLTC) in a high speed network.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

FIG. 1 shows a system architecture diagram of a Self-Learning Traffic Classifier (SLTC) in a high speed network, for example, a tier-1 ISP network such as ISP-A (101) through ISP-D (104). The high speed network may have a hierarchical architecture and supports a layered network data model (e.g., the OSI model, the TCP/IP model, or the like). The SLTC is a distributed system with several high speed monitors (or HSMs) such as the high speed monitors (105)-(107). These monitors passively observe network traffic on different links (e.g., link (109)) and try to independently classify traffic flows using layer-7 signatures each corresponding to a layer-7 application. If a high speed monitor can successfully identify the signature of a given traffic flow, then the traffic flow is marked as "known", and no further analysis is necessary to classify it.

However, if a flow cannot be successfully classified then it is forwarded to a centralized server, such as the logic server (or LS) (108) for further analysis. LS receives input from several high speed monitors and performs the following functions: (i) Aggregates and correlates inputs from different passive monitors, (ii) Classifies traffic into high level classes (e.g., multimedia, P2P, gaming traffic, etc.) based on the layer-3/layer-4 flow patterns, (iii) Generates policies (i.e., traffic forwarding policies) that will help in extracting application signatures, and (iv) Extracts signatures of applications that constitute different high level classes, and populates a signature database that will assist in future traffic classification. In an exemplary deployment of SLTC in high speed networks, each HSM is associated with a high speed link, typically a peering or customer link such as the link (109) at the edge of a network (e.g., ISP-A (101)) to classify all traffic that is entering the network through that link. Hence several HSMs (e.g., HSM (105)-(107)) may be required to monitor all the peering/customer links in a network (e.g., ISP-A (101)).

Figure 2:
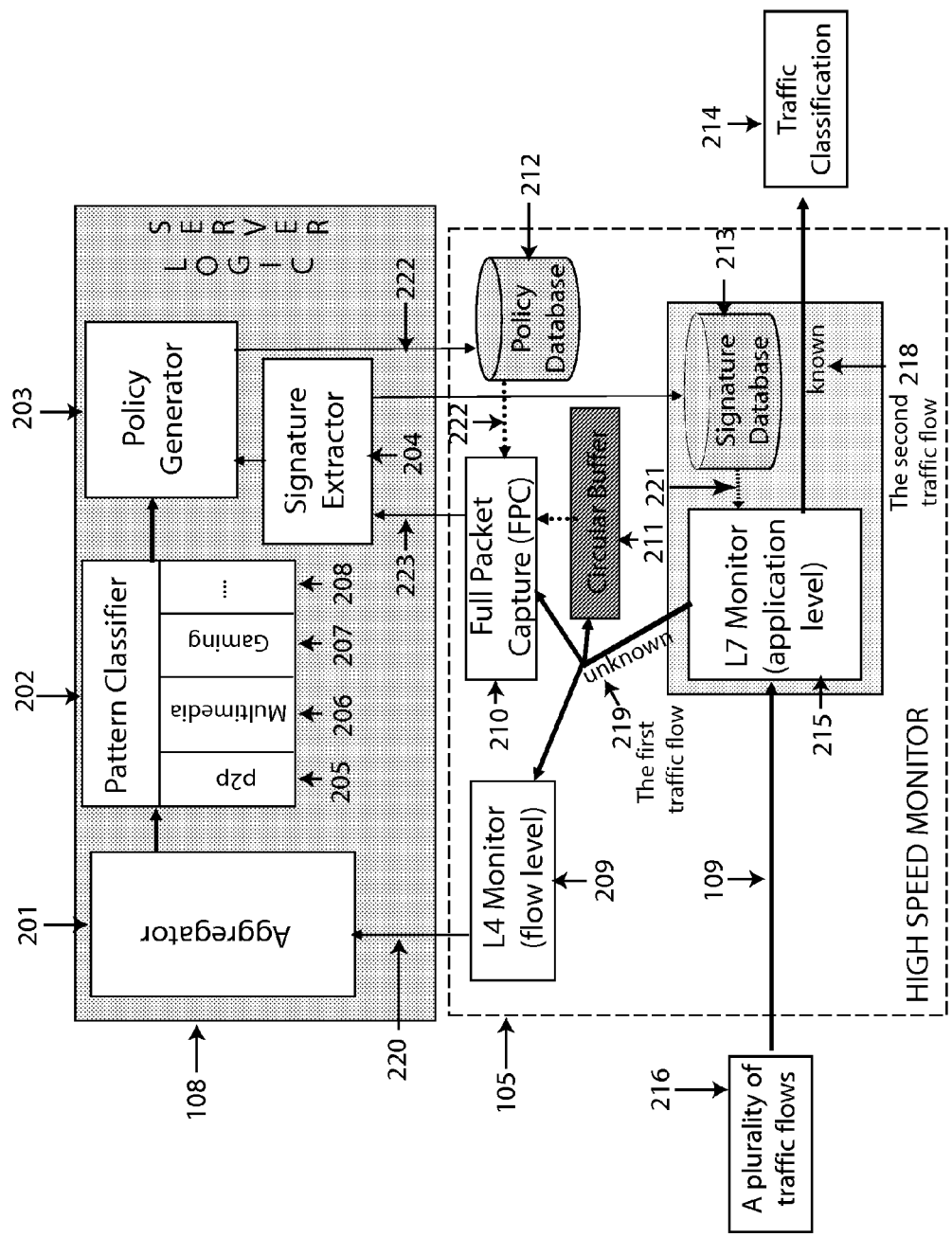
FIG. 2 shows a block diagram of the SLTC for classifying network traffic on a network link.

FIG. 2 shows a block diagram of the SLTC including a logic server (108) and a high speed monitor (105). Although the logic server (108) can receive inputs from several high speed monitors, in this example only one high speed monitor (105) is shown in FIG. 2. The logic server (108) includes Aggregator (201), Pattern Classifier (202), Policy Generator (203), and Signature Extractor (204). The Pattern Classifier (202) may include multiple modules such as the P2P module (205), the Multi-media module (206), the Gaming module (207), and other module (208). The high speed monitor (105) includes L7 monitor (215), L4 monitor (209), Full Packet Capture (or FPC) module (210), traffic buffer (211), policy repository (212), and signature repository (213). All traffic (e.g., a plurality of traffic flows (216) from link (109)) that HSM (105) observes passes through the L7 monitor (215). With the help of the signature repository (213) (e.g., implemented as a database) the L7 monitor (215) tries to classify traffic (e.g., a plurality of traffic flows (216)). If the signature database (212) has a signature (221) that matches the payload of the current flow (e.g., the second traffic flow (218)), then the second traffic flow (218) is marked as "known" and sent out of the monitor. Any flow ((e.g., the first traffic flow (219)) that does not have a matching signature is marked as "unknown" and sent to the other modules for further analysis.

Any flow ((e.g., the first traffic flow (219)) that is marked as "unknown" by the L7 Monitor (215) is forwarded to the L4 monitor (209). The main functionality of the L4 monitor (215) is to extract only layer-3/layer-4 header information (220) from layer-3/layer-4 packets of an unknown flow ((e.g., the first traffic flow (219)) and forward the layer-3/layer-4 header information (220) to the Aggregator (201) in the logic server (201) to identify high-level application classes.

The main functionality of FPC (210) is to provide input to the Signature Extractor (20) in the logic server (108) to extract signatures (221) of individual applications. Although FPC (210) is designed to capture packets of the entire traffic flow ((e.g., the first traffic flow (219)) including the application payload and pass them to the logic server (108), in many examples (e.g., various tier-1 carrier networks) this may not be necessary. Typically, signatures for applications can be captured by looking at the first few packets (e.g., 5 packets) in a flow and the first few bytes (e.g., 100 bytes) of application payload in each packet. In order to minimize the amount of communication between HSM (105) and the logic server (108), FPC (210) selectively determines the following based on the traffic forwarding policies (223) specified in the policy repository (212) (e.g., implemented as a database): (i) The flows ((e.g., the first traffic flow (219)) that need to be forwarded to the logic server (108), (ii) The number of packets from each flow that should be sent, and (iii) The number of bytes in each packet that should be sent. Note that the policy database (212) is updated with new policies (222) after the "unknown" flows ((e.g., the first traffic flow (219)) are classified into high-level classes by the Pattern Classifier (202) in LS (108).

The traffic buffer (221) may be implemented as a circular buffer (i.e., oldest data overwritten first after the buffer fills up) that stores all the flows marked "unknown" ((e.g., the first traffic flow (219)) by L7 monitor (215). The main purpose of the traffic buffer (211) is to speed up the input from FPC (210) to the signature extractor (204) in LS (108). For all the policies (222) in the policy database (212), FPC (210) first tries to find matching a flow in the traffic buffer (211). If it finds one or more matching flows ((e.g., the first traffic flow (219)) in the traffic buffer (211), then it forwards them immediately to the signature extractor (204). However, if there is no match then FPC (210) waits for the "unknown" flows arriving from the L7 monitor (215) that match the traffic forwarding policies (222) to forward them to the signature extractor (204).

Although there may be several distributed HSMs in a SLTC deployment, there is usually a single logic server in a network deployment. The main functionality of LS is to accomplish multi-stage traffic classification based on the complete view of the network provided by the distributed HSMs. The modules in logic server (108) are described in detail below. The main function of the aggregator (201) is to receive input from several HSMs (e.g., HSM (105), correlate them to eliminate duplicates, reorder them (if necessary) based on packet timestamp, and deliver them to the pattern classifier (202).

The main functionality of the pattern classifier (202) is to classify traffic (e.g., the plurality of traffic flows (216)) into high-level classes based only on layer-3 and layer-4 information (220) in each traffic flow ((e.g., the first traffic flow (219)). A high-level class represents a group of applications exhibiting the same generic properties that can be used to distinguish them from applications in another class. For example, all real-time voice traffic can be grouped into the same high-level class (called multimedia class) since all of them exhibit similar delay and/or loss properties. Similarly, traffic from most unstructured P2P networks can be grouped into the same class since all of them rely on similar superpeer (or ultrapeer) technology. The pattern classifier comprises of several disparate modules (e.g., modules (205)-(208)), each of them focusing on identifying a high-level class based on the generic properties of flows. These modules are designed to make the pattern classifier highly configurable by providing the flexibility in defining new classes or defining combinations of existing high-level classes. These modules can either be connected to each other in a serial fashion, (i.e., the output from one module can be the input to another module) or in a parallel fashion (i.e., modules work independently of each other). For example, connecting the P2P module and multimedia module in a serial fashion will result in a new high-level class where all the traffic identified are P2P flows that carry multimedia traffic. Each of these modules runs sophisticated algorithms for identifying high-level classes.

The main function of the policy generator (203) is to generate policies (222) based on the output of the pattern classifier (202), and populate the policy databases (212) in different HSMs (e.g., HSM (105)-(107)). These policies (222) are used by FPC (210) in HSM (105) to forward appropriate traffic ((e.g., the first traffic flow (219)) to the signature extractor (204). For example, a policy may be specified as a vector {destination ip address, number of packets in a flow, number of bytes in each packet}. Note that these policies are generated using heuristics, and each class of traffic (or classification) can have a different heuristic for the corresponding traffic forwarding policy. In many examples, the policy generation process in SLTC may be iterative. In other words, if a particular policy (222) generated by the policy generator (203) does not lead to a successful signature extraction, then the signature extractor (204) conveys this to the policy generator (203) using a feedback channel (223). The policy generator (203) modifies the existing policy accordingly. This iteration can continue until a signature is successfully identified or a maximum allowed number of iterations is reached.

The main function of the signature extractor (204) is to extract signatures (221) for different applications that belong to the same high-level class identified by the pattern classifier (202). This signature extractor (204) takes as input packets from flows ((e.g., the first traffic flow (219)) that are classified by the pattern classifier (202) as belonging to the same class, and extracts the invariant part of the packet payload as the signature (e.g., the signature (221)).

Figure 5:
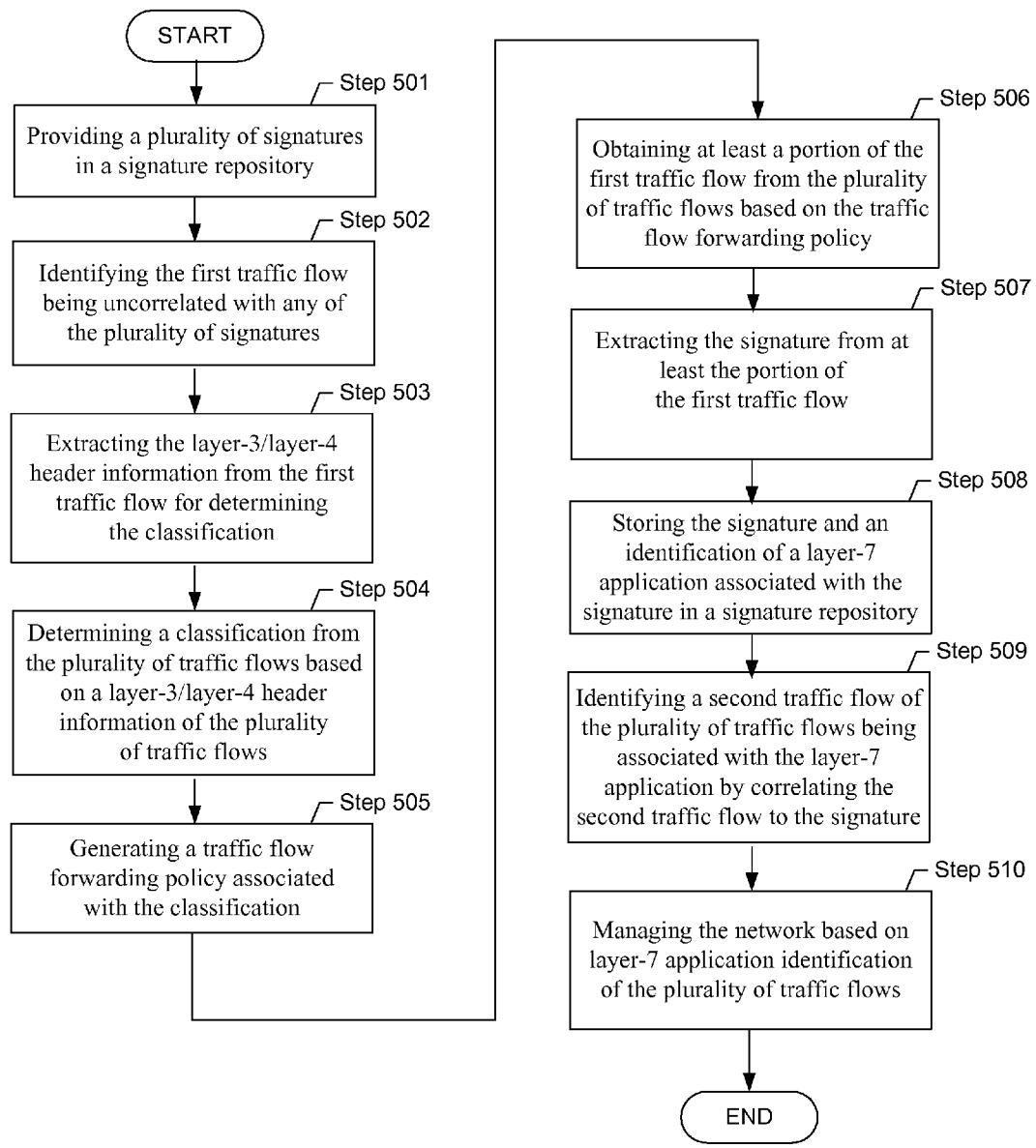
FIG. 5 shows a flow chart of method for classifying network traffic in a high speed network.

FIG. 5 shows a flow chart of method for classifying network traffic in a high speed network. This method can be practiced in a high speed network such as shown in FIG. 1 using the SLTC system as shown in FIG. 2 above. Initially, a plurality of signatures (e.g., (221)) are provided in a signature repository (e.g., (213)) (Step 501). These signatures are layer-7 signatures and may be provided by a manual method or a self learning process. Then a first traffic flow (e.g., (219)) is identified as being uncorrelated (or "unknown") with any of the plurality of signatures (e.g., (221)) in the signature repository (e.g., (213)), for example by the L7 monitor (215) (Step 502). A layer-3/layer-4 header information (e.g., (220)) is extracted from the first traffic flow, for example by the L4 monitor (209) (Step 503). There may be other layer-3/layer-4 header information from other traffic flows extracted by other HSMs (e.g., (106), (107)) that are aggregated by the Aggregator (201). Then a classification from the plurality of traffic flows (e.g., (216)) is determined, for example by the policy classifier (202) based on the layer-3/layer-4 header information of the plurality of traffic flows (e.g., the first traffic flow (219) of the plurality of traffic flows (216)) (Step 504). A traffic flow forwarding policy (e.g., (222)) associated with the classification is generated, for example by the policy generator (203) (Step 505). Then at least a portion of the first traffic flow (e.g., (219)) from the plurality of traffic flows (e.g., (216)) is forward, for example by the FPC (210) to the signature extractor (204) based on the traffic flow forwarding policy (222) (Step 506). The first traffic flow (219) may be obtained from a traffic buffer (211) where the first traffic flow (219) are stored while the classification and traffic forwarding policy are being determined/generated. Subsequently, a signature (e.g., (221)) from the first traffic flow (e.g., (219)) of the plurality of traffic flows ((e.g., (216)) on the network ((e.g., (216)) is extracted based on layer-3/layer-4 information ((e.g., (220)) of the first traffic flow, for example by the signature extractor (204) (Step 507). The signature (221) and an identification ((e.g., (214)) of a layer-7 application associated with the signature (221) is stored in a signature repository ((e.g., (213)) (Step 508). A second traffic flow ((e.g., (218)) of the plurality of traffic flows ((e.g., (216)) is associated with the layer-7 application (214) by correlating the second traffic flow (218) to the signature (221) (Step 509). Accordingly, the network is managed based on the layer-7 application identification (214) of the plurality of traffic flows (216). For example, an Internet Service Provider (ISP) may provide better quality of service to other revenue-generating delay/loss sensitive applications if the layer-7 application identification (214) indicates the second traffic flow (218) as non-profitable P2P traffic.

An example of the method described above relating to a peer-to peer network is given below. The main goal of the peer-to-peer pattern classifier (e.g., module (205)) is to detect peer-to-peer traffic flows without looking into the payload of the packets. The example for identifying P2P traffic class relies on the following observations in hybrid P2P networks (i.e., P2P networks that use superpeer technology). When a peer (or host) joins a P2P network, it typically connects to one or more servers and/or superpeers. If the peer connects to a server (as in the case of a few hybrid P2P networks) at the start, then the server provides the peer with the superpeer contact information. The peer will eventually contact the superpeer to let the superpeer know of its arrival. It also lets the superpeer know how other peers in the network can contact it (i.e., its ip address and port number). The superpeer now has the responsibility to let other peers in the network know how to contact the new peer that arrived in the network. Hence the superpeer sends this information to some/all other nodes that use it as a superpeer and to other superpeers that are its neighbors. A similar process occurs when a node wants to search for information in the P2P network. In other words, the superpeer acts as the gateway to forward the search query (and occasionally data as well) to some/all parts of the P2P network.

Figure 3A:
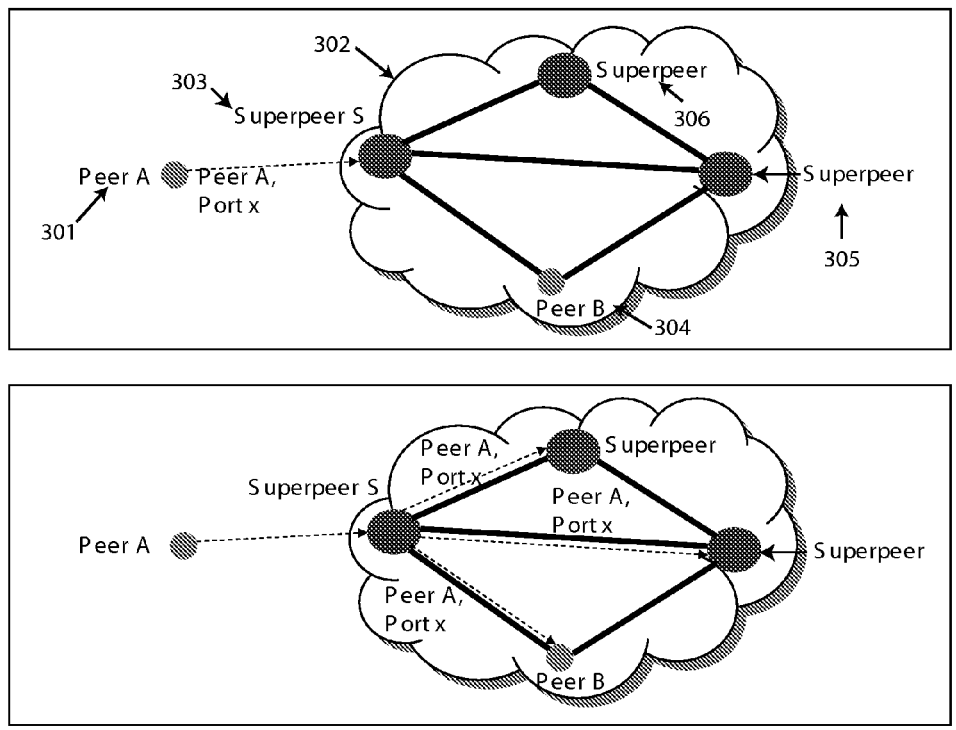
FIG. 3a shows a block diagram of a peer-to-peer network.

FIG. 3a shows a block diagram of a peer-to-peer network and depicts the process above. When a new peer, (e.g., Peer A (301)), joins the P2P network (302), it talks to a superpeer, (e.g., Superpeer S (303)) found in its host cache (not shown), which is a table containing all the neighboring peers. The information about the superpeer could already be in the host cache of Peer A (301) due to the past network activity, or it could be obtained from a centralized database by first connecting to a central server. Either ways, Peer A (301) ultimately connects to Superpeer S (303), and sends the information that can be used by other peers (e.g., Peer B (304)) to contact Peer A (301). As soon as Superpeer S (303) receives this information, it forwards the information to other peers (e.g., Peer B (304)) and superpeers (e.g., Superpeers (305) and (306)) that are connected to it. This process of disseminating the peer contact information is critical in P2P networks for two reasons: (i) Fault tolerance: A typical P2P network experiences a lot of churn (i.e., peers joining and leaving the network). In FIG. 3a, if Superpeer S (303) decides to leave the network (302), then Peer A (301) loses connectivity to the rest of the network (302). If other superpeers (e.g., Superpeers (305) and (306)) know about Peer A (301), then they can take over the responsibility from Superpeer S (303), thus providing all the required services to Peer A (301). (ii) File download/upload: Peers (e.g., Peer B (304)) in the network need contact information of Peer A (301) to upload/download files.

Based on the above observations, when a new node arrives into the P2P network, a superpeer accepts a connection from the node, and subsequently opens a connection to one or more other nodes in the network. From the perspective of a superpeer, an incoming connection is closely followed in time by one or more outgoing connections. Hence superpeers in P2P networks can be identified by observing connections coming into and leaving a node in close succession. This is called time correlation metric (or TCM), i.e., a metric that captures the temporal correlation between the incoming and outgoing connections.

Figure 3B:
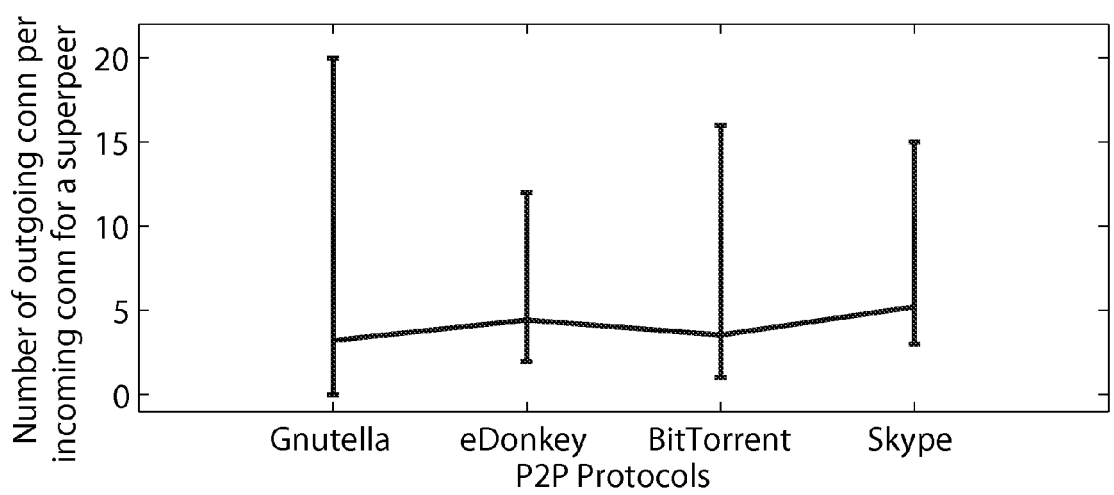
FIG. 3b shows a histogram associated with a superpeer in a peer-to-peer network.

FIG. 3b shows a histogram associated with a superpeer in a peer-to-peer network. The histogram shows the max, min and average number of outgoing connections per incoming connection for superpeers (that were manually identified for illustration purpose) in four different P2P protocols. It can be seen on an average there are 4-5 outgoing connections per incoming connection for all the superpeers. There are several reasons that TCM is effective for identifying P2P traffic in high speed networks (e.g., a tier-1 ISP networks) by monitoring peering links: (i) Churn in P2P Networks. P2P networks experience a lot of churn and support constant searches. Since TCM aims to exploit the P2P network behavior during these commonly occurring events, TCM is very effective. (ii) Location of HSM. HSM monitors all bidirectional traffic on a peering link. Given that peers in P2P networks typically connect to random superpeers, there is a very high probability that several incoming and outgoing connections from the same superpeer crosses a peering link multiple times. Unlike other prior art approaches, TCM only requires to monitor a few flows for every superpeer. Once again, this results in an advantage for TCM. Another important point is that monitoring network traffic on peering links also eliminates false positives to a large extent. Consider a hierarchical DNS system where higher level DNS servers are located outside a network. A recursive DNS query to a DNS server in this system could result in the server opening new connections to other DNS servers. However, the natural association of network borders and the DNS servers in a hierarchical system, ensures that the HSM (coupled to a peering link) does not capture all the incoming and outgoing connections of such DNS servers. The same is true for other applications such as SMTP, pop3, etc.

The TCM algorithm is shown in Table 1 below.

TABLE I

TCM (CURTIME, NEWFLOW(sIP, DIP, sPORT, DPORT, L4PROT))

1: OutgoingFlows(sIP, sPort), add(curTime, newFlow)
2: IncomingFlows(dIP, dPort), add(curTime, newFlow)
3: for all (F such that F ∈ IncomingFlows(sI P, sPort)) do
4:   if ((consideredDstIP does not contain dIP) and (curTime−F.time) < $T_{th}$) then
5:     considered DsIP.add(dIP)
6:     pattern(sIP, sPort) ← pattern(sI P, sPort) + 1
7:     if (pattern(sI P, sPort) > $P_{th}$) then
8:       repetition(sI P, sPort) ← repetition (sI P, sPort) + 1
9:       if (pattern (sI P, sPort) > $P_{th}$) then
10:         P2NodePortPair.add(sI P, sPort)

The algorithm is characterized by three parameters:

(i) TCM Time Threshold $T_{th}$.

This parameter represents the maximum time difference between incoming and outgoing connections in superpeers. A large value for $T_{th}$ means that unrelated incoming and outgoing flows will be grouped together. A very small value of $T_{th}$ implies that even the flows that are correlated are not grouped together. Hence choosing an optimal value of this metric is critical to the effectiveness of TCM.

(ii) TCM Pattern Threshold $P_{th}$.

As illustrated in FIG. 3a above, every incoming connection to the superpeer from a new peer (or a search query from the existing peer) results in several outgoing connections from the superpeer. $P_{th}$ represents the number of outgoing connections that should be temporally correlated with an incoming connection to assume that a TCM pattern has occurred. A very high value of this parameter could lead to many false negatives (i.e., P2P superpeers not identified as superpeers), while as a small value could lead to false positives (non-P2P nodes identified as superpeers).

(iii) TCM Repetition Threshold $R_{th}$.

If superpeer is observed for a long period of time, then the TCM pattern (i.e., one incoming connection resulting in several outgoing connections) should occur several times. $R_{th}$ is used as a parameter to specify the number of times that we should see the TCM pattern before declaring a node to be a superpeer in a P2P network. Note that a very small value could imply that non-P2P nodes could be included in the superpeer set by pure coincidence. However, a large value could once again lead to false negatives.

An assumption in the TCM heuristic is that when a new peer establishes a connection with the superpeer, the superpeer opens new connections to other existing superpeers and/ or peers to convey the information about the new peer. However, in reality this might not always be true. That is, the superpeer may convey the information about the new peer using existing connections to other superpeers/peers.

Figure 4:
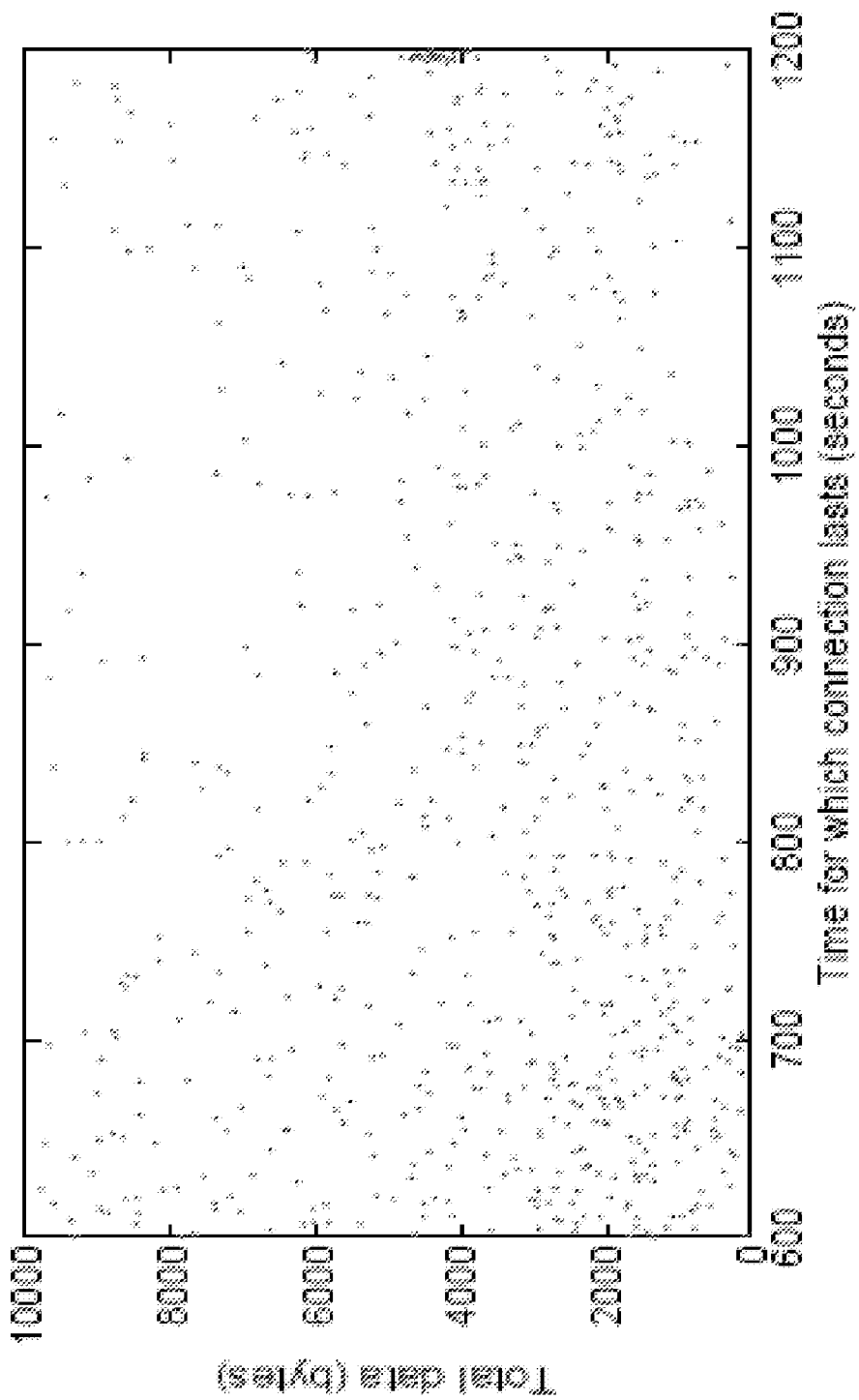
FIG. 4 shows a statistic diagram of a peer-to-peer network.

FIG. 4 shows a statistic diagram of a peer-to-peer network. The statistic diagram shows the total data exchanged on P2P connections that last longer than 10 minutes in an experimental trace. It can be seen that there are several connections that last for a long time, but the total data that is exchanged on these connections is still very small (less that 10000 bytes) suggesting that these are long lasting control connections that carry little data. Ignoring communications on such long lasting connections results in several false negatives in TCM. Hence, in TCM algorithm, instead of always consider new outgoing connections, in addition, existing connections carrying small control packets are also considered. Furthermore, small outgoing control packets on existing connections are considered only if: (i) the connection lasts for a long time, and (ii) the average packet size of the connection is also small. This heuristic eliminates the possibility of considering small packets from non-control flows.

An exemplary signature extraction algorithm (e.g., implemented in signature extractor (204) is described below. The goal of the signature extraction algorithm is to automatically extract signatures for different applications in the high-level classes identified by the pattern classifier. The input to this algorithm is a set of flows from FPC based on the policies in the policy database. These policies are set based on the output from the pattern classifier. The policies used for different high level classes could be different. However, in this example, a simple policy is used where all bytes of the first packet of a flow are forwarded to signature extractor until a signature is found or the signature extractor decides that no signature can be extracted.

Extracting signatures of the first generation Internet applications (e.g., ftp, etc.) was simple since all flows that belong to hose applications followed a specific predefined pattern that could be identified using a simple substring matching algorithm. However today's applications (e.g., P2P, gaming, etc.) try to disguise themselves using complex polymorphic flow behavior (e.g., signatures appear in different packets in every flow and different position in each packet). In other words, applications change their behavior by using floating signatures that appear in different places in different flows, thus making it very hard to extract their signature and identify them. In addition, the number of applications in the Internet has increased exponentially making it impractical to extract signatures manually.

In the context of SLTC, another challenging issue is that the application to which each flow belongs to is not known. For instance, TCM can only determine whether a node is running a P2P application or not, but not the particular P2P application that it is running. This makes it harder to extract a unique signature for each application. To deal with this challenge, in the exemplary algorithm described below: (i) all flows destined to a particular node on a particular port, and using a given layer-4 protocol is assumed to be using the same layer-7 protocol, and (ii) there could be several nodes running the same application. Hence the signatures needs to be consolidated from a per node level to a per application level.

TABLE 2 below shows the traffic forwarding algorithm, for example implemented in FPC (210).

TABLE 2

FWDPKTTTOSE(sIP, DIP, sPORT, DPORT, L4PROT, PAYLOAD)

```
1: curFlow ← < sI p, dI P, sPort, dPort, L4Prot >
2: if (< dI P, dPort > ∉ policyDatabase) then
3:    return
4: currentlyActiveFlowsList ← List of all active flows in HSM
5: if (currentlyActiveFlowsList.contains(curFlow)) then
6:    if (first packet of flow) then
7:       payloadList (dI P, dPort).add(payload)
8:       if (sI P ∉ srcIPList (dI P, dPort)) then
9:          srcIPList(dI P, dPort).add (sI P)
10:      if (size(srcI PList(dI P, dPort)) > C) then
11:         call ExtractSignature(dI P, dPort, payloadList(dI P, dPort))
```

The FwdPktToSE method in TABLE 2 may be implemented in the FPC module. Based on the policies for a <dIP, dPort> pair (Lines 2 and 6 in TABLE 2) in the policy database, the FPC module forwards the appropriate payload information (Line 11 in TABLE 2) in the incoming packets to the SE module in LS. For each <dIP,dPort> pair, FwdPktToSE method forwards packets from at least C distinct peers (Line 10 in TABLE 2). The main idea here is to ensure that the input to the SE module is statistically not biased, thus resulting in a more generic signature. Although a large value of C results in more generic signatures, it will increase the time delay (i.e., time spent waiting for packets and processing times) in extracting signatures for a <dIP,dPort> pair.

The exemplary algorithm for extracting signatures for a <sIP,sPort> pair is shown in TABLE 3 below.

TABLE 3

EXTRACTSIGNATURE(IP, PORT, PAYLOADLIST)

```
1: //...minStrLen - min signature length
2: sigSet(IP, Port) ← commonSubstrings(payloadList, minStrLen)
3: policyDatabase.remove(IP, Port)
4: if (sigSet(IP, Port) ≠ ∅) then
5:    if (sigSet(IP, Port) ≡ (signature in database for App x)) then
6:       nodePortPairsForApplication(x).add(IP, Port)
7:    else if (sigSet(IP, Port) ⊂ (sigSet in database for App x)) then
8:       signatureForapplication(x).replace(sigSet(IP, Port))
9:       nodePortPairsForApplication(x).add(IP, Port)
10:   else if (sigSet(IP, Port) ⊃ (sigSet in database for App x)) then
11:      nodePortPairsForApplication(x).add(IP, Port)
12:   else
13:      signatureDatabase(App $x_{new}$).add (sigSet(IP, Port))
14:      nodePortPairsForApplication($x_{new}$).add(IP, Port)
```

Common substrings are extracted in the payloads of packets that are sent to the SE module in the logic server. All these substrings are assumed to be at least 3 bytes long and appear starting at a fixed position (referred to as the index) in the packet payloads. In other examples, considering floating substrings could significantly improve the quality of signatures. Every matching substring (along with the starting index) (i.e., <index,str> pair) is considered as a signature. For every <IP, Port> pair, the SE module extracts a set of signatures. This set of signatures is referred to as sigSet (IP,Port) (Line 3 in TABLE 3). Given that multiple <IP,Port> pairs could be running the same L7 protocol, it is important to consolidate these signatures before populating the signature database. In Lines 5-14 in TABLE 3, the extracted sigSet is compared with all the other signatures in the database to ensure that it is not a subset or duplicate of other existing sets of signatures.

It will be understood from the foregoing description that various modifications and changes may be made in the preferred and alternative embodiments of the present invention without departing from its true spirit. For example, although the examples given above relates to a peer-to-peer network, additional pattern classification modules may be included for other application classes, e.g., the multi-media module, the gaming module, etc. Furthermore, the high speed network, the network data model, the first and second traffic flows, the layer-3/layer-4 header information, the layer-7 application signature, the layer-7 application classification, the traffic forwarding policy, the TCM algorithm, the traffic forwarding algorithm, and the signature extraction algorithm may be supplemented by variations of the examples described or include subset or superset of the examples given above, the method may be performed in a different sequence, the components provided may be integrated or separate, the devices included herein may be manually and/or automatically activated to perform the desired operation. The activation (e.g., providing the plurality of signatures to the signature depository) may be performed as desired and/or based on data generated, conditions detected and/or analysis of results from the high speed network traffic.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A self learning system for managing a network, comprising:
    a logic server for extracting a signature from a first traffic flow of a plurality of traffic flows on the network based on layer-3/layer-4 information of the first traffic flow;
    a signature repository operatively coupled to the logic server for storing the signature and an identification of a layer-7 application associated with the signature; and
    a high speed monitor operatively coupled to the logic server and the signature repository for identifying a second traffic flow of the plurality of traffic flows being associated with the layer-7 application by correlating the second traffic flow to the signature, wherein the high speed monitor is operatively coupled to the network for monitoring the network and forwarding at least a portion of the plurality of traffic flows to the logic server;
    wherein the network comprises a peer-to-peer network;
    wherein the layer-3/layer-4 information is obtained based on a time correlation metric (TCM) of the first traffic flow; and
    wherein the TCM is associated with a superpeer of the peer-to-peer network.

2. The system of claim 1, wherein the logic server comprises:
    a pattern classifier for determining a classification from the plurality of traffic flows based on a layer-3/layer-4 header information of the plurality of traffic flows;
    a policy generator operatively coupled to the pattern classifier for generating a traffic flow forwarding policy associated with the classification; and
    a signature extractor operatively coupled to the high speed monitor for extracting the signature from the first traffic flow based on at least a portion of the first traffic flow, wherein the high speed monitor forwards at least the portion of the first traffic flow to the signature extractor based on the traffic flow forwarding policy.

3. The system of claim 2, wherein the high speed monitor comprises:
    a policy repository operatively coupled to the policy generator for storing the traffic flow forwarding policy;
    the signature repository storing a plurality of signatures;
    a layer-7 monitor for identifying the first traffic flow being uncorrelated with any of the plurality of signatures; and
    a low level monitor for extracting the layer-3/layer-4 header information from the first traffic flow and providing the layer-3/layer-4 header information to the logic server, whereby the classification is determined, the traffic flow forwarding policy policy is generated, at least the portion of the first traffic flow is forwarded, and the signature is extracted and added to the plurality of signatures.

4. The system of claim 1, wherein the TCM comprises temporal correlation of a plurality of incoming connections and outgoing connections on a peering link associated with the superpeer, wherein the TCM differentiate the superpeer from a peer in the peer-to-peer network.

5. The system of claim 4,
    wherein the network comprises a service provider network having one or more peering link, and
    wherein the high speed monitor is operatively coupled to the peering link for reducing false negatives in the TCM associated with the superpeer.

6. A method of managing a network, comprising:
    extracting a signature from a first traffic flow of a plurality of traffic flows on the network based on layer-3/layer-4 information of the first traffic flow;
    storing the signature and an identification of a layer-7 application associated with the signature in a signature repository;
    identifying a second traffic flow of the plurality of traffic flows being associated with the layer-7 application by correlating the second traffic flow to the signature; and
    managing the network based on layer-7 application identification of the plurality of traffic flows;
    wherein the network comprises a peer-to-peer network;
    wherein the layer-3/layer-4 information is obtained based on a time correlation metric (TCM) of the first traffic flow; and
    wherein the TCM is associated with a superpeer of the peer-to-peer network.

7. The method of claim 6, further comprising:
    determining a classification from the plurality of traffic flows based on a layer-3/layer-4 header information of the plurality of traffic flows;
    generating a traffic flow forwarding policy associated with the classification;
    obtaining at least a portion of the first traffic flow from the plurality of traffic flows based on the traffic flow forwarding policy; and
    extracting the signature from at least the portion of the first traffic flow.

8. The method of claim 7, further comprising:
    providing a plurality of signatures in a signature repository;
    identifying the first traffic flow being uncorrelated with any of the plurality of signatures;
    extracting the layer-3/layer-4 header information from the first traffic flow for determining the classification; and
    storing the signature in the signature repository.

9. The method of claim 6, wherein the TCM comprises temporal correlation of a plurality of incoming connections and outgoing connections on a peering link associated with the superpeer, wherein the TCM differentiate the superpeer from a peer in the peer-to-peer network.

10. The method of claim 9,
    wherein the network comprises a service provider network having one or more peering link, and
    wherein the high speed monitor is operatively coupled to the peering link for reducing false negatives in the TCM associated with the superpeer.

11. A computer readable medium, embodying instructions executable by the computer to perform method steps for managing a network, the instructions comprising functionality to:
    extract a signature from a first traffic flow of a plurality of traffic flows on the network based on layer-3/layer-4 information of the first traffic flow;
    store the signature and an identification of a layer-7 application associated with the signature in a signature repository;
    identify a second traffic flow of the plurality of traffic flows being associated with the layer-7 application by correlating the second traffic flow to the signature; and manage the network based on layer-7 application identification of the plurality of traffic flows;

wherein the network comprises a peer-to-peer network;

wherein the layer-3/layer-4 information is obtained based on a time correlation metric (TCM) of the first traffic flow; and wherein the TCM is associated with a superpeer of the peer-to-peer network.

12. The computer readable medium of claim 11, the instructions further comprising functionality to: determine a classification from the plurality of traffic flows based on a layer-3/layer-4 header information of the plurality of traffic flows; generate a traffic flow forwarding policy associated with the classification; obtain at least a portion of the first traffic flow from the plurality of traffic flows based on the traffic flow forwarding policy; and extract the signature from at least the portion of the first traffic flow.

13. The computer readable medium of claim 11, the instructions further comprising functionality to: provide a plurality of signatures in a signature repository; identify the first traffic flow being uncorrelated with any of the plurality of signatures; extract the layer-3/layer-4 header information from the first traffic flow for determining the classification; and store the signature in the signature repository.

* * * * *